April 25, 1933.  J. M. LABBERTON  1,905,234

MEANS FOR PREVENTING OIL LEAKAGE FROM BEARINGS

Filed Dec. 20, 1929

INVENTOR
John M. Labberton.

BY Chesley G. Carr
ATTORNEY

Patented Apr. 25, 1933

1,905,234

UNITED STATES PATENT OFFICE

JOHN M. LABBERTON, OF PITTSBURGH, PENNSYLVANIA, ASSIGNOR TO WESTINGHOUSE ELECTRIC & MANUFACTURING COMPANY, A CORPORATION OF PENNSYLVANIA

MEANS FOR PREVENTING OIL LEAKAGE FROM BEARINGS

Application filed December 20, 1929. Serial No. 415,478.

My invention relates to means for preventing oil leakage from bearings subject to difference of pressure at their opposite ends and, more particularly, to a method of preventing oil leakage from a bearing into the windings of a vacuum or suction-ventilated motor or generator.

Prior to my invention, heavy-duty motors or generators cooled by the suction system have been subject to oil leakage from the bearings at the ends of the casing; that is, the bearings are exposed, at one end, to the supply pressure of the ventilating medium and, at the other end, to a slight vacuum due to the suction drawing the ventilating medium through the machine. This difference in pressure has caused oil from the bearings to be drawn out into the ventilating fluid and deposited in the windings of the machine, causing a reduction in cooling surface and also impairing the heat conductivity of the surface, thereby causing the machine to overheat. The oil deposited on the insulation of dynamo-electric machines also impairs such insulation by dissolving the binder and eventually causing an electrical breakdown. The oil further provides a sticky mass to which will adhere dirt of all kinds that may be in the ventilating medium, thus further impairing the radiating surfaces by providing a heat-insulating layer. Also, such dirt is frequently of fairly good electrical conductivity and, therefore, endangers the electrical properties of the machine by providing a path of low resistance between the electrical members.

An object of my invention is to prevent such oil leakage from a bearing.

A further object of my invention is to prevent such leakage into suction-ventilated machines.

Figure 1:
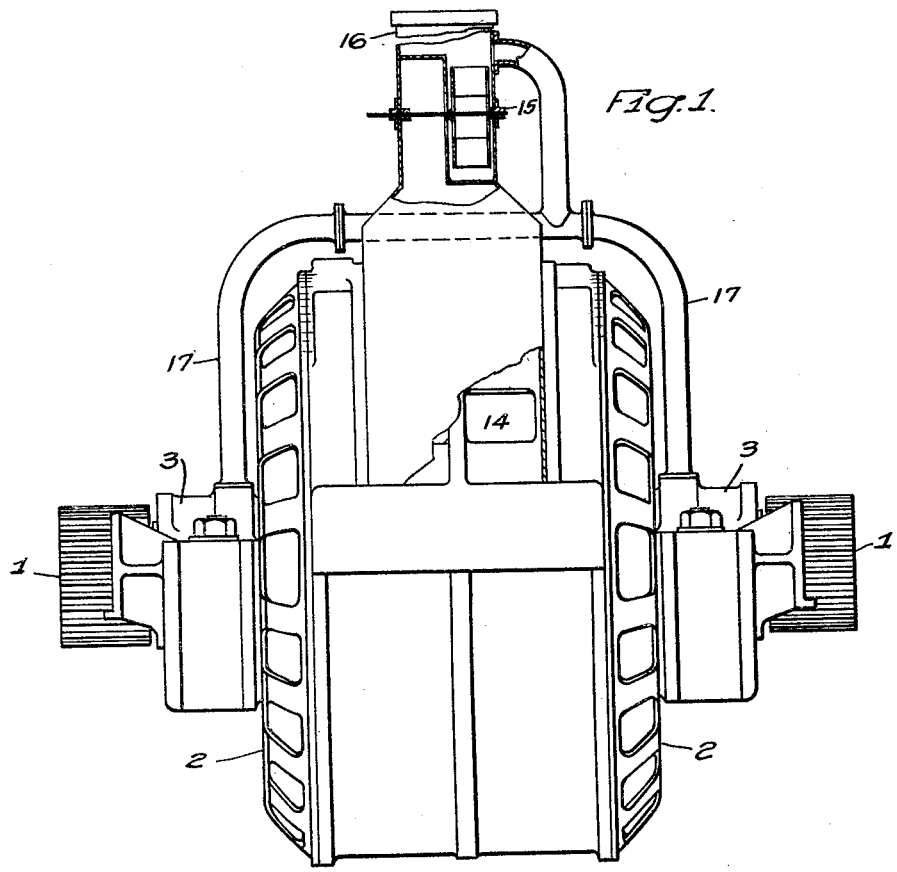
Figure 2:
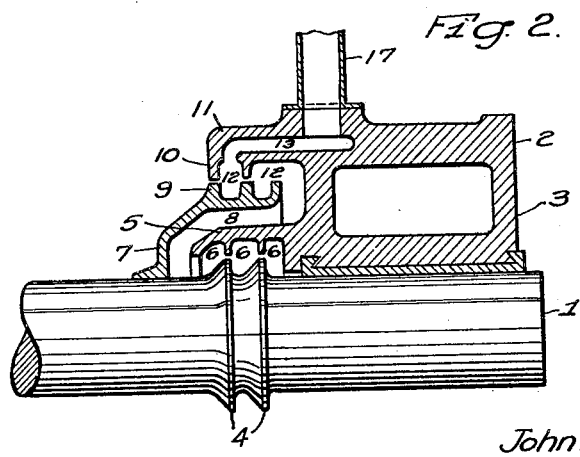

Other objects of my invention will be evident from the following description, taken in conjunction with the accompanying drawing, in which:

Figure 1 is a front elevation of a motor having my invention attached thereto, and Fig. 2 is a cross-section of the bearing, showing the particular mode of attachment to the bearing.

The apparatus comprises a shaft or axle 1, bearing the rotating elements of the machine, which is journalled in the casing 2 carrying the stationary machine parts. The casing 2 is provided with a bearing 3 to receive the shaft. The shaft 1 is provided with annular projections or oil throwers 4 to cooperate with an over-hanging lip 5 on the stationary housing 2 to provide oil-collecting chambers 6. Oil, escaping from the bearing along the shaft, is thrown off by the oil-throwing rings 4 and collected in the annular pockets 6 of the overhanging lip 5, draining from there to an oil-supply reservoir (not shown) below the shaft.

However, a quantity of oil will escape past the oil throwers 4 and come into contact with a wiper ring 7 rigidly attached to the shaft 1. Between said wiper ring and the casing 2 is an annular passage 8 through which any escaping oil must pass. The wiper ring 7 is provided with oil throwers 9 cooperating with projecting fingers 10 on a projection 11 attached to the casing 2, said oil throwers 9 and fingers 10 providing oil-collecting chambers 12. Into the outermost of these oil-collecting chambers 12 extends a passage 13 for a purpose to be presently described.

The ventilating system comprises a source of supply for ventilating fluid, usually an open-air space in connection with an open end of the casing. In connection with openings 14 provided in the casing, a suction element, such as a fan or blower 15, is provided to exhaust ventilating fluid from the source of supply through the casing. The fan or blower 15 is provided with a duct or stack 16 to discharge the fluid that has been exhausted from the casing. The suction element 15 may be mounted in an extension of the machine casing but is preferably inserted at some point in the exhaust stack 16.

The bearing or bearings, at the open end or ends of the casing at which ventilating fluid is supplied, will be subject to a difference in pressure at opposite ends because the external end of the bearing is exposed to the pressure of the source from which ventilating fluid is drawn, while the inner end of the bearing is subject to a partial vacuum caused by the suction through the machine. In many cases, the bearings at both ends of the casing are subject to this difference in pressure on account of the ventilating fluid being exhausted from the inside of the casing. This difference in pressure between the ends tends to draw oil out of the bearing into the ventilating medium. To counteract such losses, I have provided the bearing housings with the passages 13 connected to the oil-collecting chamber 12 which is farthest from the bearing surface. Into this passage 13, ventilating fluid is conducted by means of a duct or pipe 17 leading from such passage to the pressure side of the blower or fan 15 creating the suction through the machine. The ventilating fluid conducted through duct 17 and passage 13 into the oil-collecting chamber 12 will be at a slightly greater pressure than that prevailing at the inner end of the bearing. This pressure tends to neutralize all suction through the bearing itself, or even to create a back pressure to push the oil back into the bearing proper, instead of allowing the same to be drawn into the machine.

In operation, the suction device creates a suction through the casing of the machine to be cooled, but, on the discharge side of such suction device, a pressure will be built up in the discharge stack or chamber. The small duct or pipe 17 is so connected that it is supplied with fluid at this built-up pressure which, when conducted into the oil-collecting chamber 12 of the bearing, supplies a pressure in said chamber to compensate for the suction through the bearing due to the ventilating suction.

It is my intention to include within the scope of my invention all modifications or variations which may be defined by the terms of appended claims.

I claim as my invention:

1. In connection with a suction-ventilated machine having a bearing subject to the suction, said bearing having an oil-collecting chamber, means to create the ventilating-suction, exhaust means for the suction-creating means, and a duct leading from the said exhaust means to the said oil-collecting chamber.

2. In combination with a suction-ventilated machine having a bearing subject to the ventilating-suction, said bearing having a plurality of oil-collecting chambers, means for creating said ventilating suction, means for exhausting said suction-creating means, and means for conducting fluid from said exhaust means to one of said oil-collecting chambers.

3. A suction-ventilated machine having a bearing provided with a plurality of oil-collecting chambers, a suction ventilating means for drawing a ventilating fluid through said machine, and means for conducting air from the pressure side of the suction ventilating means to the outer oil-collecting chamber of the bearing.

4. A suction-ventilated machine having means to provide the ventilating suction, exhaust means for the suction-providing means, a bearing provided with an oil-collecting chamber, and means for conducting fluid from said exhaust means into said oil-collecting chamber.

In testimony whereof, I have hereunto subscribed my name this 12th day of December 1929.

JOHN M. LABBERTON.